(12) United States Patent
Johansson et al.

(10) Patent No.: US 11,567,652 B2
(45) Date of Patent: Jan. 31, 2023

(54) ELECTRONIC DEVICE AND METHOD FOR THE ELECTRONIC DEVICE TO NAVIGATE BETWEEN WINDOWS

(71) Applicant: Huawei Technologies Co., Ltd., Shenzhen (CN)

(72) Inventors: Panu Johansson, Helsinki (FI); Joakim Mårtensson, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/034,687

(22) Filed: Sep. 28, 2020

(65) Prior Publication Data

US 2021/0011596 A1    Jan. 14, 2021

Related U.S. Application Data

(63) Continuation of application No. 15/791,849, filed on Oct. 24, 2017, now Pat. No. 10,817,161, which is a continuation of application No. PCT/EP2016/060985, filed on May 17, 2016.

(51) Int. Cl.
| | | |
|---|---|---|
| *G06F 3/048* | (2013.01) | |
| *G06F 3/0485* | (2022.01) | |
| *G06F 3/0488* | (2022.01) | |
| *G06F 3/0482* | (2013.01) | |
| *G06F 3/04883* | (2022.01) | |
| *G06F 3/04842* | (2022.01) | |

(52) U.S. Cl.
CPC ......... *G06F 3/0485* (2013.01); *G06F 3/0482* (2013.01); *G06F 3/0488* (2013.01); *G06F 3/04883* (2013.01); *G06F 3/04842* (2013.01); *G06F 2203/04803* (2013.01)

(58) Field of Classification Search
CPC .... G06F 3/0482; G06F 3/0485; G06F 3/0488; G06F 3/04885
See application file for complete search history.

(56) References Cited

U.S. PATENT DOCUMENTS

| | | |
|---|---|---|
| 10,078,420 B2 | 9/2018 | Helle |
| 2010/0281374 A1 | 11/2010 | Schulz et al. |
| 2011/0035708 A1 | 2/2011 | Damale |

(Continued)

FOREIGN PATENT DOCUMENTS

| | | |
|---|---|---|
| CN | 102037435 A | 4/2011 |
| CN | 102169411 A | 8/2011 |

(Continued)

OTHER PUBLICATIONS

"How to navigate using the back stack for Windows Phone 8," retrieved from the internet on Nov. 14, 2017, 16 pages.

*Primary Examiner* — Claudia Dragoescu
(74) *Attorney, Agent, or Firm* — Conley Rose, P.C.

(57) ABSTRACT

An electronic device includes a display and a processor configured to detect a first gesture in a predefined area of the display while a first window is currently displayed in full screen on the display and upon detection of the first gesture instruct the display to display a gallery of previously opened windows, and detect a second gesture in the predefined area on the display. The second gesture is a movement along the display. The processor is further configured to instruct the display to scroll based on the movement through the gallery.

20 Claims, 5 Drawing Sheets

(56) References Cited

U.S. PATENT DOCUMENTS

| | | |
|---|---|---|
| 2011/0131521 A1 | 6/2011 | Cho et al. |
| 2011/0161878 A1* | 6/2011 | Stallings ............... G06F 3/0485 |
| | | 715/811 |
| 2012/0084711 A1 | 4/2012 | Duarte et al. |
| 2012/0166975 A1 | 6/2012 | Oh et al. |
| 2013/0174179 A1* | 7/2013 | Park ...................... G06F 9/4843 |
| | | 718/107 |
| 2013/0198677 A1 | 8/2013 | Dash |
| 2013/0246970 A1 | 9/2013 | Helle |
| 2013/0298057 A1 | 11/2013 | Duarte et al. |
| 2015/0067605 A1* | 3/2015 | Zambetti ............... G06F 3/0485 |
| | | 715/830 |
| 2015/0169071 A1* | 6/2015 | Jitkoff .................. G06F 3/0485 |
| | | 715/863 |
| 2015/0185987 A1 | 7/2015 | Tsai et al. |
| 2018/0046343 A1 | 2/2018 | Johansson et al. |
| 2019/0018565 A1* | 1/2019 | Lee ....................... G06F 1/1643 |

FOREIGN PATENT DOCUMENTS

| | | |
|---|---|---|
| CN | 102521034 A | 6/2012 |
| CN | 103092835 A | 5/2013 |
| CN | 103870119 A | 6/2014 |
| CN | 104024985 A | 9/2014 |
| CN | 104750409 A | 7/2015 |
| CN | 104850345 A | 8/2015 |
| CN | 107454951 B | 12/2020 |
| EP | 2908259 A1 | 8/2015 |

* cited by examiner

ELECTRONIC DEVICE AND METHOD FOR THE ELECTRONIC DEVICE TO NAVIGATE BETWEEN WINDOWS

CROSS-REFERENCE TO RELATED APPLICATIONS

This application is a continuation of U.S. patent application Ser. No. 15/791,849, filed on Oct. 24, 2017, which is a continuation of International Patent Application No. PCT/EP2016/060985, filed on May 17, 2016. All of the aforementioned patent applications are hereby incorporated by reference in their entireties.

TECHNICAL FIELD

The present disclosure relates to an electronic device and a method for controlling the electronic device. In particular, the electronic device and the method of the present disclosure are able to scroll through a gallery of previously opened windows based on a movement along a display of the electronic device, in order to facilitate a quick switch between different previously opened windows.

BACKGROUND

Applications in mobile terminals typically have many pages for a user to navigate. For example, a web browser has a history list with pages or web URLs that the user has visited.

In the state of the art, a mobile terminal, e.g., a Window Phone, may have a physical hardware back and menu keys. With a web browser, a user has to navigate one page at a time to a desired page in the web history list. For example, the user goes forward via menu and typically the menu only allows one page at a time navigation.

However, actuating the menu is slow and navigating back or forward requires at least two clicks per page. Firstly, clicking the hardware menu key. Secondly, clicking either one of the arrows on the top of the appearing menu. The distance between the physical key and the menu arrow is rather long on the screen, which leads to slowness and thereof discomfort for the user when performing the inner-application navigation.

SUMMARY

In view of the above mentioned problems, particularly the problem of the slowness of the inner-application navigation, the present disclosure aims to improve the state of the art. Therefore, the present disclosure has the object to provide an electronic device and a method for the electronic device to facilitate the navigation through previously opened windows and thereby improving user experience.

The above-mentioned object of the present disclosure is achieved by the solution provided in the enclosed independent claims. Advantageous implementations of the present disclosure are further defined in the respective dependent claims.

A first aspect of the present disclosure provides an electronic device, including a display; and a processor configured to detect a first gesture in a predefined area of the display while a first window is currently displayed in full screen on the display and upon detection of the first gesture instruct the display to display a gallery of previously opened windows; wherein the processor is further configured to subsequently upon detecting a second gesture in the predefined area on the display. The second gesture is a movement (in the predefined area) along the display. Furthermore, the processor is configured to instruct the display to scroll based on the movement through the gallery. The predefined area could for example at maximum cover the lower 25%, preferably the lower 10% and even more preferably the lower 5% of the display.

Hence, a first gesture in the predefined area can be used to open the gallery and a second gesture in the same predefined area can be used to scroll through the gallery. The gallery of windows provides all the possible choices to fall back, which facilitates navigation through previously opened windows.

As the two gestures are detected in one and the same predefined area of the display, the user does not need to move his fingers around the display to access the two different functions of opening the gallery and scrolling through it. Hence, the speed of navigation is improved and is independent of the size of the electronic device.

In a first implementation form of the electronic device according to the first aspect, the display is configured to display a (virtual) button inside the predefined area.

By using a button for defining the predefined area, a user can easily understand where he has to touch the display to achieve the opening and scrolling through the gallery.

In a second implementation form of the electronic device according to the first implementation form of the first aspect, the movement is a movement along the predefined area starting at the button, and the display is configured to scroll through the gallery by subsequently moving one of the windows in the gallery in the foreground while putting the remaining windows of the gallery in the background. For example, a window can be put in the foreground by highlighting or focusing (e.g. placing in the middle of the screen) on the window. Furthermore, the processor is configured to upon detecting an end of the movement instruct the display to display in full screen a second window which was in the foreground when the movement ended. For example, the second window replaces the first window when the movement ended. Furthermore, when the second window replaces the first window as full screen window, the first window is added to the gallery of the previously opened windows. The predefined area could for example at maximum cover the lower 25%, preferably the lower 10% and even more preferably the lower 5% of the display.

Thereby, the windows could be visually distinguished based on their status on the display, e.g., foreground or background, which facilitates the user to focus on a candidate window. The candidate window has a highest possibility to be displayed as a next full-screen window.

Other examples to provide a visually distinguishing effect between windows in a foreground and background may be a central compared to a border position of the windows, a large compared to a small size of the windows, a dark compared to a light color of the windows, or a window with a shadow compared to windows without shadows.

In a third implementation form of the electronic device according the second or third implementation form of the first aspect, each of the first window and the previously opened windows belongs to different applications.

Hence, an efficient scrolling through different applications can be achieved.

In a fourth implementation form of the electronic device according to the second or third implementation forms of the first aspect each of the first window and the previously opened windows belongs to a different nested layer of the same application, which was displayed in the foreground when the first gesture was detected.

Hence efficient inner application navigation is facilitated.

In a fifth implementation form of the electronic device according to the fourth implementation forms of the first aspect, the button indicates a nesting layer of the window (i.e. which nested layer the window belongs to) currently shown in full screen on the display. A nesting between different windows can for example be achieved if a root window provides a link to a first nested window (first nesting layer) and the first nested window provides a link to a second nested window (second nesting layer).

By adding to the button the functionality of showing to the user the nesting layer, the user always knows in which nesting layer of the application the window he is currently looking it is arranged. For example, if a user has a window with a low nesting layer (e.g. one layer above a root window) in full screen he may decide to go back to the root window by a simple back click. But if the user has a window with a high nesting layer (e.g. nesting layer 3 or higher), the user may decide to use the described scrolling function to go back to the root window instead of back clicking several times. Hence, a more flexible and convenient window switching in one and the same application is achieved.

In a sixth implementation form of the electronic device according to the fourth or fifth implementation form of the first aspect, the processor is configured to detect a third gesture in a further predefined area of the display while the first window is currently displayed in full screen on the display and upon detection of the third gesture instruct the display to display a further gallery of further previously opened windows of previously opened applications. The processor is further configured to subsequently upon detecting a fourth gesture in the further predefined area on the display, the fourth gesture being a further movement (in the further predefined area) along the display, instruct the display to scroll based on the further movement through the further gallery. The further predefined area could for example at maximum cover the lower 25%, preferably the lower 10% and even more preferably the lower 5% of the display. Furthermore, the predefined area may cover an area from the bottom of the display up to 25%, preferably 10% and even more preferably 5% of the height of the display and from a first side of the display up to 10%, preferably 25% and even more preferably 50% of the width of the display. Furthermore, the further predefined area may cover an area from the bottom of the display up to 25%, preferably 10% and even more preferably 5% of the height of the display and from a second side which is opposite to the first side of the display up to 10%, preferably 25% and even more preferably 50% of the width of the display.

This implementation form extends the switching between nested layers of one and the same application by the switching between different applications. Both the nested layer switching mechanism and the application switching mechanism base on the same functional principle of performing two gestures in a predefined area. Hence, not only the advantages for both mechanisms are similar but it is also achieved that the user has to learn functional principle only once but can apply it to both—nested layer switching and application switching. Hence, a very convenient navigation mechanism between various windows and applications is achieved.

In a seventh implementation form of the electronic device according to the sixth implementation forms of the first aspect, the display is configured to display a further button inside the further predefined area.

In an eighth implementation form of the electronic device according to the sixth or seventh implementation forms of the first aspect, each of the first window and the further previously opened windows belongs to a different application.

In a ninth implementation form of the electronic device according to the eighth implementation forms, each of the further previously opened windows belongs to the layer of the corresponding application in which the application was when the application was opened the last time. Or in other words, the windows of the previously opened application stored in the further gallery are the windows which were in full screen when the corresponding application was removed from the full screen.

In other words, the gallery of windows and the further gallery of windows are related with each other due to a certain window being in both galleries. For example, all the windows in the gallery belong to one and the same application which this certain window belongs to. In contrast to this, the windows in the further gallery are the ones which were opened in different applications last time. Thus, the electronic device provides more choices for the user to conveniently fall back.

In a tenth implementation form of the electronic device according to the first aspect as such or according to the previous implementation form of the first aspect, the electronic device is a portable electronic device, e.g., a mobile terminal.

In an eleventh implementation form of the electronic device according to the first aspect as such or according to any of the previous implementation forms of the first aspect, the display is a touch sensitive display, and the gestures are user inputs to the touch sensitive display, e.g. causing the touch sensitive display to generate an electrical signal indicating a touch of a user on the display.

In a twelfth implementation form of the electronic device according to the first aspect as such or according to the eleventh implementation form of the first aspect, the display is configured to display a button inside the predefined area and the first gesture is a double click or a long press on the button. Or, the display is configured to display a further button inside the further predefined area and the third gesture is a double click or a long press on the further button.

In a thirteenth implementation form of the electronic device according to the first aspect as such or according to any of the previous implementation forms of the first aspect, the processor is configured to instruct the display to scroll through the gallery in a first direction based on a direction of the movement and in a second direction based on a direction of the further movement.

Thus, the appearance and scrolling of the gallery of windows on the display enable various one-hand operations for the user.

A second aspect of the present disclosure provides a method of controlling an electronic device comprising a display, including upon detecting a first gesture in a predefined area of the display while a first (opened) window is currently displayed on the display displaying a gallery of previously opened windows on the display; and subsequently upon detecting a second gesture in the predefined area on the display, the second gesture being a movement along the display, scrolling based on the movement through the gallery.

The method of the present disclosure achieves the same advantages as described above for the electronic device. The method may be carried out with additional method steps, which correspond to the functions carried out by the various implementation forms described above for the electronic device.

A third aspect of the present disclosure provides a computer program comprising a program code for performing, when running on a computer, the method according to the second aspect of the present disclosure.

BRIEF DESCRIPTION OF DRAWINGS

The above aspects and implementation forms of the present disclosure will be explained in the following description of specific embodiments in relation to the enclosed drawings.

DETAILED DESCRIPTION OF EMBODIMENTS

Figure 1:
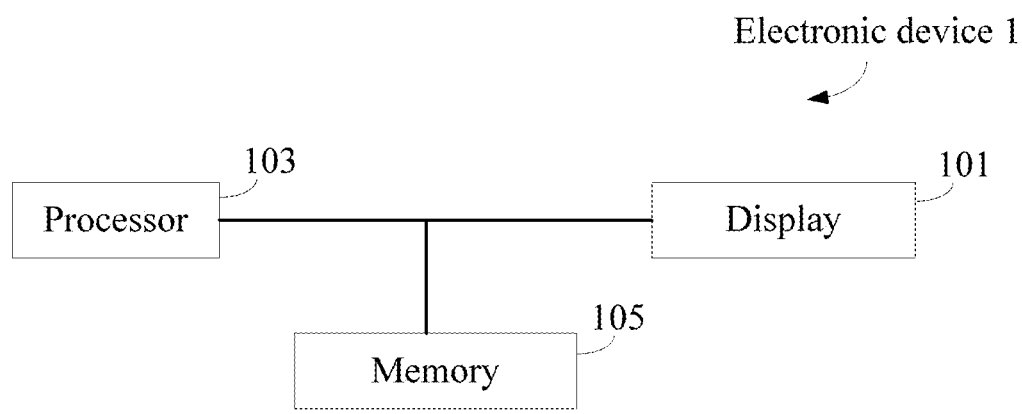
FIG. 1 shows a structure of an electric device according to an embodiment of the present disclosure.

FIG. 1 shows a structure of an electric device according to an embodiment of the present disclosure. The electronic device 100 may work under an (icon based) operation system which supports a display of various windows in the same or different applications. The electronic device 100 may be a portable electronic device. For example, a mobile terminal having a mobile operating system like Android, iOS, or Windows installed on it.

The electronic device 100 of FIG. 1 includes a display 101 with a connection to a processor 103. The processor 103 is configured to detect gestures in a predefined area of the display 101 in certain conditions. For example, a first gesture may be a double click or a long press detected in the predefined area of the display 101 while a first window is currently displayed in full screen on the display 101. Further, upon a detection of the first gesture, the processor 103 instructs the display 101 to display a gallery of previously opened windows. When during the displaying the gallery of previously opened windows the processor 103 detects a second gesture 705, e.g. a movement along the display 101 in the same predefined area, the processor 103 instructs the display 101 to scroll based on the movement through the gallery, thereby displaying to the user the different previously opened windows contained in the gallery.

The electronic device 100 may further include a memory 105, which is connected to the processor 103 and possibly also connected to the display 101. The memory 105 is configured to store operation results of the processor 103, e.g., records of windows previously displayed on the display 101.

Figure 2:
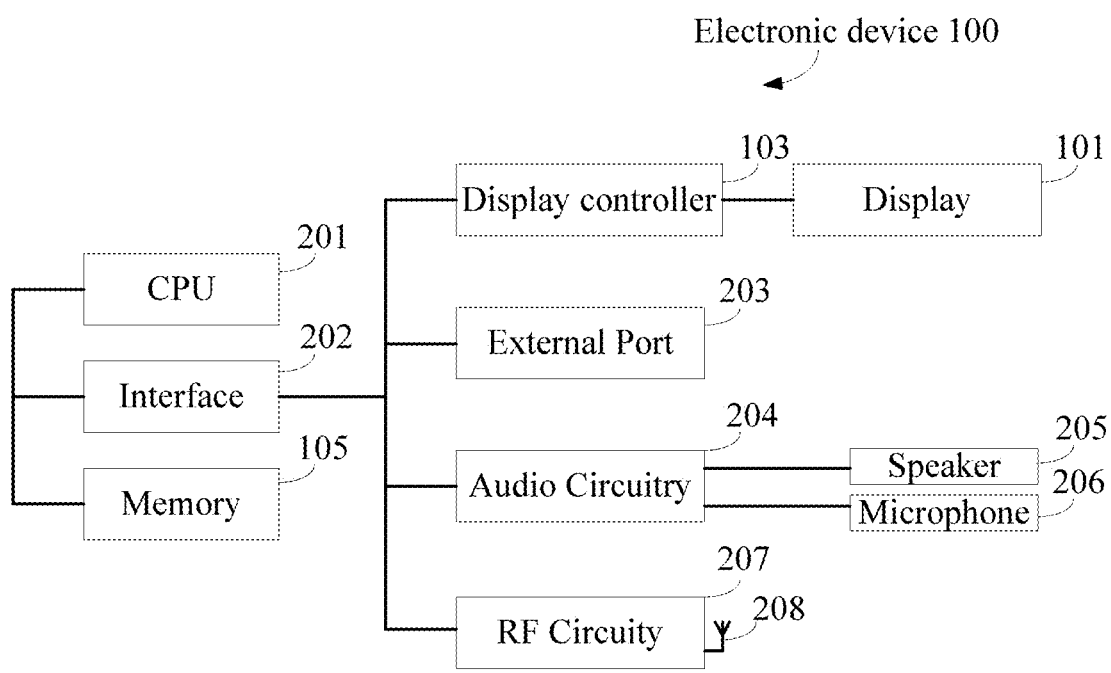
FIG. 2 shows another structure of an electric device according to an embodiment of the present disclosure.

Further, the electronic device 100 may include more components. For example, as shown in FIG. 2, the electronic device 100 includes more components such as one or more central processing units (CPUs) 201, an interface 202, an external port 203, an audio circuitry 204, a speaker 205, a microphone 206 and a radio frequency (RF) circuitry 207 with an antenna 208. These components communicate over one or more communication buses or signal lines. Besides, the various components may be implemented in hardware, software or a combination of hardware and software, including one or more signal processing and/or application specific integrated circuits.

The display 101 in the electronic device 100 of the present disclosure can be a touch sensitive display. Accordingly, the gestures detected by the processor 103 are user inputs to the touch sensitive display. The user input may be any detectable input originated outside the electronic device 100, e.g., a user pressing or moving with a finger or another suitable input device on the touch sensitive display.

Figure 3:
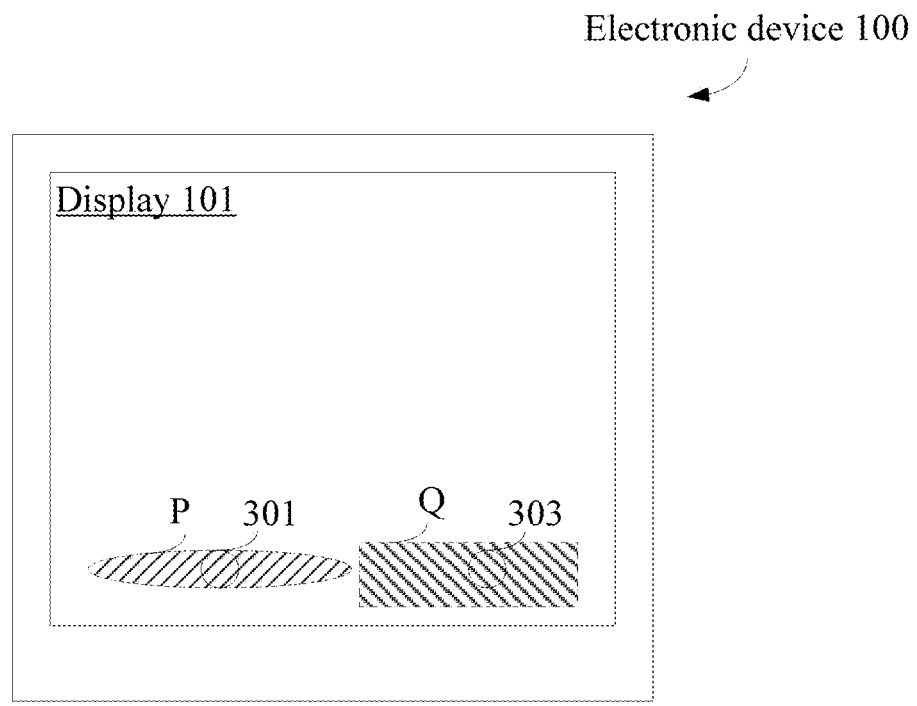
FIG. 3 shows a display of an electronic device according to an embodiment of the present disclosure.

A button can be displayed inside the predefined area. In other words, the predefined area can be defined by the button, such as a back button commonly used on the Android operation system. As shown in FIG. 3, a button 301 is displayed on the electronic device 100 in area P. The area P is the predefined area corresponding to the button 301. The area P is pre-configured, and can for example be stored as part of the operating system in the memory 105 of the electronic device 100.

A size or a shape of a button or a predefined area on the display 101 does not block the detection of the gestures, but has some influence on convenience of the user. For example, as mentioned before the second gesture can be a movement along the predefined area starting at the button. As shown in FIG. 3, the predefined area P can be a continuous straight, preferably horizontal, area covering and surrounding the button 301. Thereby a suitable size of the predefined area is achieved in which the user can perform the second gesture in form of a preferably horizontal movement. The predefined area could for example at maximum cover the lower 25%, preferably the lower 10% and even more preferably the lower 5% of the display.

When the second gesture is detected, the display 101 scrolls through the gallery by subsequently moving one of the windows in the gallery in the foreground while putting the remaining windows of the gallery in the background. In such a way, each window is highlighted as a candidate of a full-screen window one by one. Further, the window which is highlighted in the foreground when the second gesture is ended, e.g., it is detected by the processor 103 that the user releases the button 301 or the predefined area, will be determined as the next full-screen window.

For example, assuming a second gesture is a movement along the predefined area starting at the button 301, the display 101 is instructed by the processor 103 to display in full screen the currently highlighted window in the gallery when the processor 103 detects an end of the movement. In other words, the end of the movement triggers a replacement of the full-screen window. The replacement could also be called as a switch from (1) the first window, which is displayed in full screen on the display 101 when the first gesture is detected, to (2) the highlighted window, which is focused on in the gallery when the second gesture is finished. Due to the switch, the first window is recorded as a new previously opened window in the gallery of previously opened window. Or in other words, for every window switching the gallery of previously opened windows is updated.

Figure 4:
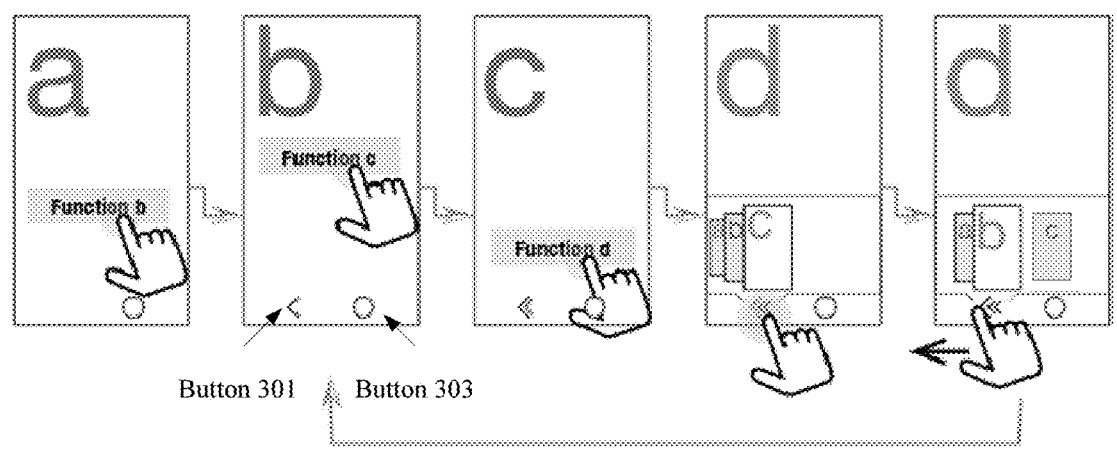
FIG. 4 shows a switch between different windows of the same application according to an embodiment of the present disclosure.

An example of a switch between different windows of the same application is shown in FIG. 4. Here, the different windows include a window currently displayed in full screen mode and the previously opened windows all belonging to the same application. The different windows respectively belong to different nested layers of said same application.

Firstly, a window "a" together with a function "b" is displayed on the display 101. The window "a" can be understood as a root window. The function may be a link or a trigger to a first nested window "b".

Secondly, when a selection of the function "b" is detected by the processor 103, the full-screen window "a" is replaced by the window "b". Hence, the window "b" together with a function "c" appears on the display 101 due to the detected selection of the function "b". Preferably, a button 301 appears at the bottom of the display 101 to indicate a nesting layer of the current full-screen window (in this case first nesting layer). For example, if the button 301 is shown using arrows, the quantity of the arrows is used to indicate the nesting layer of the current full-screen window. Taking the window "b" as an example, the button 301 is shown as one arrow, indicating that the nesting layer of the window "b" is a first nesting layer among the hierarchy structure of previously opened windows.

Thirdly, the window "b" is switched to a second nested window "c" upon a detection of a gesture for selecting the function "c". Further, the button 301 is shown using two arrows, indicating that the nesting layer of the window "c" is a second nesting layer.

Similarly, the window "c" is switched to a third nested window "d" and the button 301 is shown using three arrows, indicating that the nesting layer of the window "d" is a third nesting layer.

Assuming now, the window "d", together with a button 301 being three arrows, is displayed on the display 101.

Assuming now, a double click or a long press is detected on the button 301 a gallery of previously the opened windows "a", "b" and "c" is displayed on the display 101. The most previously opened window "c" in the gallery is displayed in the foreground as a candidate of next full-screen window while other previously opened windows "a" and "b" in the gallery are displayed in the background.

If a movement, preferably a continuous movement, in area P starting at the button 301 in a left direction (e.g. in the pointing direction of the arrows) is detected by the processor 103, the gallery of the previously opened windows "a", "b" and "c" is scrolled through on the display 101 while each of the windows "a", "b" and "c" is subsequently moved to the foreground as a candidate of next full-screen window. In a further embodiment also window "d" is displayed in the gallery of previously opened windows. Optionally, the processor 103 instructs the display 101 to scroll through the gallery in a certain direction based on a direction of the movement, e.g. a movement to the left leads to a backward scrolling and a movement to the right leads to a forward scrolling.

Upon the processor 103 detecting a disappearance or end of the movement or the processor 103 cannot detect the movement or a touch on the display 101 anymore, the current candidate of next full-screen window is selected at the moment of the detection, e.g., the window "b", replaces the window "d" to be a full-screen display. For example, the user may end the second gesture and therefore the movement, by releasing the finger or any other suitable input device from the display 101 after sliding from the button 301 to a left part of area P.

The detection of an end of a gesture, e.g., a movement along the predefined area P, provides a flexible choice for the user during navigation through previously opened windows. Thereby, any nesting layer among the hierarchy structure of an application could be selected as the next nesting layer to fall back. Any previously opened windows of an application could be selected as the next full-screen window to be displayed on the display 101 just by releasing the touch on the predefined area when the desired window is currently shown in foreground.

The windows "a", "b", "c" and "d" do not necessarily belong to the same application. That is, the embodiment above could be used to realize various switches, e.g., a switch between various windows of the same application, a switch between various windows of different applications.

Figure 5:
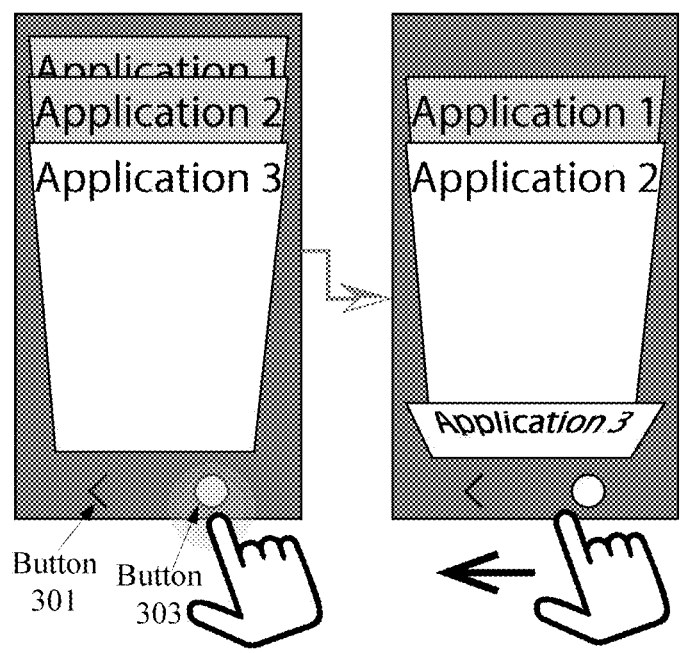
FIG. 5 shows a switch between different applications according to an embodiment of the present disclosure.

Optionally, a further button, e.g., button 303 as shown in FIG. 3, FIG. 4 and FIG. 5, is displayed on the electronic device 100 and is displayed inside a further predefined area, e.g., area Q, as shown in FIG. 3, which can be pre-configured and for example be stored as part of the operating system in the memory 105 of the electronic device 100. It is not necessary to display both button 301 and button 303 at the same time on the display 101. Hence, the two buttons could be separately used.

FIG. 5 shows an example how the further button 303 could be used for switching between different applications. In a further embodiment, the functionality of switching between applications with the further button 303 may be combined with the functionality of switching between different nested layers of the same application as for example implemented with the button 301.

As shown in FIG. 5, a further gallery of previously opened windows is displayed on the electronic device 100. Each of the three exemplary shown windows corresponds to a separate application, i.e. Application 1, Application 2 and Application 3. A long press in the further predefined area (e.g. surrounding and covering the button 303) triggers a displaying of the further gallery of the three windows. Upon detecting a continuous movement in a horizontal direction, e.g., from right to left in area Q, the processor 103 instructs the display 101 to scroll through the gallery of the three windows in a certain direction, e.g., from up to down. If an end of the movement is detected by the processor 103, the current candidate of next full-screen window selected at the moment of the detection, e.g., the window corresponding to Application 2, replaces the window corresponding to Application 3 and is consequently displayed in full screen.

As already pointed out before, a usage of the two buttons, i.e., button 301 and button 303, in the same device significantly helps the user to switch between all the previously opened windows, no matter if these are windows of different applications or of one and the same application.

Figure 6:
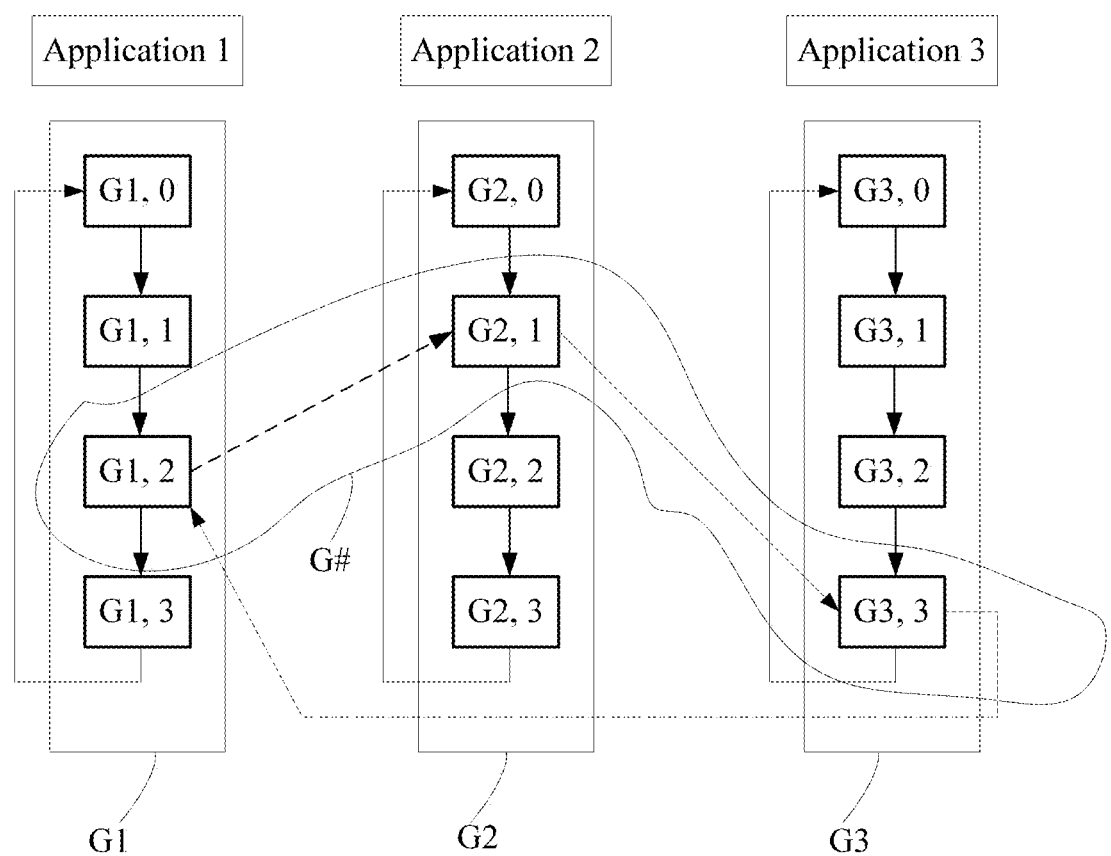
FIG. 6 shows a diagram of navigation between different windows of one of the same application and also different applications according to an embodiment of the present disclosure.

FIG. 6 describes an example how the functionalities of switching between nested layers of an application and of switching between applications can be combined into a user friendly window navigation system.

As shown in FIG. 6, solid lines with arrows indicate a possible time sequence of displayed windows of the same application, while dashed lines with arrows indicate a possible time sequence of displayed windows of different applications. It is assumed that Application 1, Application 2 and Application 3 respectively correspond to Gallery "G1", Gallery "G2" and Gallery "G3". Each window in a gallery corresponding to one application is shown as a box with an index number, where the index number indicates a nesting layer of the window among the hierarchy structure of previously opened windows of the application. Thus, a combination of a gallery name and an index number indicates a single window in FIG. 6. For example, (G1, 0)

indicates a window in the gallery corresponding to Application 1, which was opened as the 0th nesting layer (root layer).

All the previously opened windows of the same application in FIG. 6, forming a gallery (G1, G2, G3) corresponding to each application, can be switched in a way as shown in FIG. 4.

Furthermore, for each application the last opened window is stored in a further gallery "G#". The windows of the further gallery G# can be switched in a way as shown in FIG. 5.

For this example, it is assumed that, windows previously opened last time in each application are respectively (G1, 2), (G2, 1) and (G3, 3), which form the further gallery G#. Further, (G1, 2) is assumed as being currently displayed in full screen on the display 101. As shown in FIG. 3 and FIG. 6, an embodiment of the present disclosure provides a method of controlling the electronic device 100 as follows.

The processor 103 detects a first gesture in area P defined by button 301 while the first window (G1, 2) is currently displayed in full screen on the display 101. Upon detection of the first gesture, the processor 103 instructs the display 101 to display G1, i.e., a gallery of previously opened windows of Application 1 including (G1, 0), (G1, 1), (G1, 2), and (G1, 3).

Upon detecting the first gesture, if the processor 103 detects a second gesture in area P on the display 101, the processor 103 subsequently instructs the display 101 to scroll based on the second gesture through the gallery G1. If the second gesture is a movement along the area P starting at the button 301, the display 101 scrolls through the gallery G1 by subsequently moving one of the windows in the gallery G1 in the foreground, while putting the remaining windows of the gallery G1 in the background. Further, upon detecting an end of the movement, the processor 103 instructs the display 101 to display in full screen a second window (e.g. G1, 1) which was in the foreground when the movement ended.

Assuming for this example that the window (G1, 2) is again shown in full screen, if the processor 103 detects a third gesture in the area Q of the display 101 while the first window (G1, 2) is currently displayed in full screen on the display 101, upon detection of the third gesture the processor 103 instructs the display 101 to display the further gallery G# of further previously opened windows of the previously-opened applications. The sequence of the previously opened windows in the further gallery G# corresponds to the sequence in which the windows were previously opened.

Upon detecting the third gesture, if the processor 103 detects a fourth gesture in area Q on the display 101, the processor 103 subsequently instructs the display 101 to scroll based on the fourth gesture through the further gallery G#. If the fourth gesture is a further movement along the area Q starting at button 303 on the display 101, the display 101 scrolls through the gallery G# by subsequently moving one of the windows in the gallery G# in the foreground while putting the remaining windows of the gallery G# in the background.

Upon the processor 103 detecting an end of the further movement, the processor 103 instructs the display 101 to display in full screen a fourth window, e.g., (G3, 3), which was in the foreground when the further movement ended.

Figure 7:
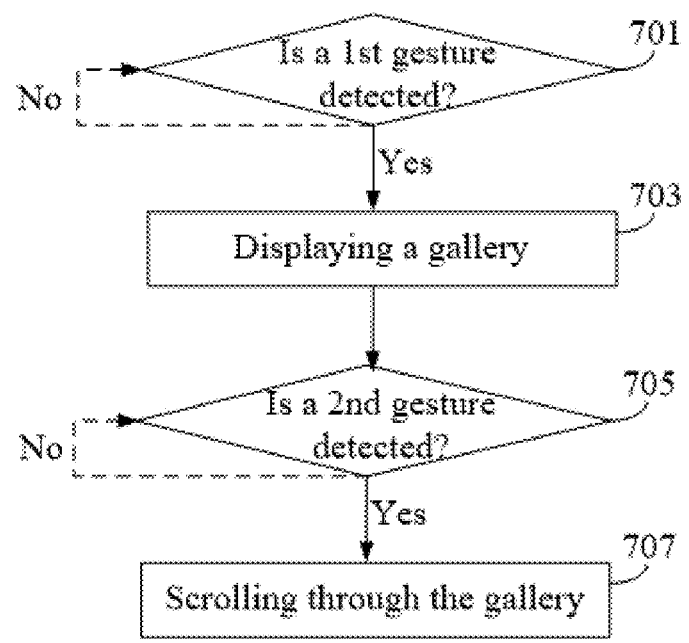
FIG. 7 shows a method for the electronic device according to an embodiment of the present disclosure.

A method for an electronic device according to an embodiment of the present disclosure is shown in FIG. 7.

In step 701, it is determined whether a first gesture is detected in a predefined area of the display 101 of the electronic device while a first window is currently displayed in full screen on the display 101. If yes, a gallery of previously opened windows is displayed on the display 101 in step 703.

Subsequently, in step 705 it is determined whether a second gesture is detected in the predefined area on the display 101. For example, the second gesture is a movement along the display 101. If yes, scrolling through the gallery based on the movement in step 707 is initiated.

In summary, the electronic device 100 and the method are able to facilitate the navigation through previously opened windows on the display 101 and thereby improving user experience.

The present disclosure has been described in conjunction with various embodiments herein. However, other variations to the disclosed embodiments can be understood and effected by those skilled in the art in practicing the claimed present disclosure, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. An electronic device, comprising:
a display;
a memory configured to store instructions; and
a processor coupled to the display and the memory, wherein the processor is configured to execute the instructions, which cause the processor to be configured to:
   instruct the display to display a first window in full screen on the display;
   detect a first gesture in a predefined area of the display while the first window is being displayed in full screen on the display;
   instruct the display to display a gallery of previously-opened windows above and outside of the predefined area in response to detecting the first gesture in the predefined area;
   detect a second gesture in the predefined area on the display; and
   instruct the display to scroll through the gallery in response to detecting the second gesture in the predefined area,
   wherein the second gesture is a movement along the display.

2. The electronic device of claim 1, wherein the display is configured to display a component inside the predefined area.

3. The electronic device of claim 1, wherein the second gesture is a movement along the predefined area, and wherein the display is configured to scroll through the gallery by moving one of the previously-opened windows to the foreground while putting remaining windows of the previously-opened windows in the background.

4. The electronic device of claim 1, wherein the instructions further cause the processor to be configured to instruct the display to display in full screen a second window upon detecting an end of the movement, and wherein the second window is one of the previously-opened windows in the gallery.

5. The electronic device of claim 1, wherein the instructions further cause the processor to be configured to instruct the display to display in full screen a second window upon detecting a disappearance of the movement, and wherein the second window is one of the previously-opened windows in the gallery.

6. The electronic device of claim 1, wherein the instructions further cause the processor to be configured to instruct the display to display in full screen a second window when the processor cannot detect the movement on the display, and wherein the second window is one of the previously-opened windows in the gallery.

7. The electronic device of claim 1, wherein the instructions further cause the processor to be configured to instruct the display to display in full screen a second window when the processor cannot detect a touch on the display, and wherein the second window is one of the previously-opened windows in the gallery.

8. The electronic device of claim 1, wherein the instructions further cause the processor to be configured to:
move one of the previously-opened windows in the gallery to the foreground;
put remaining windows of the previously-opened windows in the background; and
display in full screen a second window in response to a termination of scrolling through the gallery, wherein the second window is the one of the previously-opened windows that is displayed in the foreground.

9. The electronic device of claim 1, wherein the second gesture immediately follows the first gesture.

10. The electronic device of claim 1, wherein the first gesture and the second gesture are single-finger gestures.

11. The electronic device of claim 1, wherein each of the previously opened windows belongs to a different application.

12. The electronic device of claim 1, wherein each of the previously-opened windows belongs to a different nested layer of the same application.

13. The electronic device of claim 11, wherein the instructions further cause the processor to be configured to:
detect a third gesture in a second predefined area of the display while the first window is being displayed in full screen on the display;
instruct the display to display a second gallery of second previously-opened windows of multiple previously-opened applications in response to detecting the third gesture;
detect a fourth gesture in the second predefined area on the display, wherein the fourth gesture is a second movement along the display; and
instruct the display to scroll through the second gallery based on the second movement.

14. A method performed by an electronic device comprising a display, the method comprising:
instructing the display to display a first window in full screen;
detecting a first gesture in a predefined area of the display while the first window is being displayed in full screen on the display;
instructing the display to display a gallery of previously opened windows above and outside of the predefined area in response to detecting the first gesture in the predefined area;
detecting a second gesture in the predefined area on the display; and
instructing the display to scroll through the gallery in response to detecting the second gesture in the predefined area, wherein the second gesture is a movement along the display.

15. The method of claim 14, further comprising displaying a component inside the predefined area.

16. The method of claim 14, wherein the second gesture is a movement along the predefined area, and wherein the method further comprises scrolling through the gallery by moving one of the previously opened windows to the foreground while putting remaining windows of the previously opened windows in the background.

17. The method of claim 14, further comprising instructing the display to display in full screen a second window in response to detecting an end of the movement, wherein the second window is one of the previously opened windows in the gallery.

18. The method of claim 14, further comprising:
moving one of the previously opened windows in the gallery to the foreground;
putting remaining windows of the previously opened windows in the background; and
displaying in full screen a second window in response to detecting that a scrolling through the gallery has stopped, wherein the second window is the one of the previously opened windows that is displayed in the foreground.

19. The method of claim 14, wherein the second gesture immediately follows the first gesture.

20. A computer program product comprising computer-executable instructions for storage on a non-transitory computer-readable medium that, when executed by a processor, cause an electronic device to:
instruct a display of the electronic device to display a first window in full screen;
detect a first gesture in a predefined area of the display while a first window is being displayed in full screen on the display;
instruct the display to display a gallery of previously opened windows above and outside of the predefined area in response to detecting the first gesture in the predefined area;
detect a second gesture in the predefined area on the display; and
instruct the display to scroll through the gallery in response to detecting the second gesture in the predefined area, wherein the second gesture is a movement along the display.

* * * * *